United States Patent
Pinel et al.

(10) Patent No.: US 10,574,607 B2
(45) Date of Patent: *Feb. 25, 2020

(54) VALIDATING AN ATTACHMENT OF AN ELECTRONIC COMMUNICATION BASED ON RECIPIENTS

(71) Applicant: International Business Machines Corporation, Armonk, NY (US)

(72) Inventors: Florian Pinel, New York, NY (US); Edward E. Seabolt, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 420 days.

This patent is subject to a terminal disclaimer.

(21) Appl. No.: 15/157,823

(22) Filed: May 18, 2016

(65) Prior Publication Data

US 2017/0339083 A1    Nov. 23, 2017

(51) Int. Cl.
*H04L 12/58* (2006.01)
*G06F 17/27* (2006.01)

(52) U.S. Cl.
CPC ............ *H04L 51/08* (2013.01); *G06F 17/274* (2013.01); *G06F 17/2785* (2013.01); *H04L 51/063* (2013.01)

(58) Field of Classification Search
CPC ....... H04L 51/066; H04L 51/04; G10L 17/08; G10L 25/63
See application file for complete search history.

(56) References Cited

U.S. PATENT DOCUMENTS

| | | | |
|---|---|---|---|
| 6,912,519 B2 | 6/2005 | Shouji | |
| 8,095,613 B1 | 1/2012 | Perkowitz et al. | |
| 8,160,867 B1 | 4/2012 | Shaw | |
| 9,043,196 B1* | 5/2015 | Leydon | G07F 17/3244 704/4 |
| 9,076,125 B2 | 7/2015 | Manolescu et al. | |
| 2005/0075880 A1 | 4/2005 | Pickover et al. | |

(Continued)

OTHER PUBLICATIONS

EDrawSoft, "Organizational Chart;" Feb. 27, 2007, https://web.archive.org/web/20070227182343/https://www.edrawsoft.com/Organizational-chart.php.*

(Continued)

*Primary Examiner* — Scott B Christensen
(74) *Attorney, Agent, or Firm* — Francis Lammes; Stephen J. Walder, Jr.; William J. Stock

(57) ABSTRACT

A mechanism is provided for validating an attachment to an electronic communication being composed based on the recipients of the electronic communication. An associated tone or theme of the at least one attachment to the electronic communication being composed by a sender and an identity of each of one or more recipients to whom the electronic communication is to be sent and the sender are identified. One or more previous electronic communications sent to or received from one or more of the one or more recipients and at least one tone of each of the one or more previous electronic communications are identified in order to generate one or more preferred tones. Responsive to identifying a tone discrepancy between the tone or theme of the at least one attachment and the one or more preferred tones, a notification is presented to the sender.

18 Claims, 3 Drawing Sheets

(56) References Cited

U.S. PATENT DOCUMENTS

| | | | | |
|---|---|---|---|---|
| 2006/0168036 | A1* | 7/2006 | Schulz | G06Q 10/107 709/206 |
| 2007/0050188 | A1 | 3/2007 | Blair et al. | |
| 2009/0019021 | A1* | 1/2009 | Davies | G06F 17/30616 |
| 2009/0287678 | A1 | 11/2009 | Brown et al. | |
| 2011/0066587 | A1 | 3/2011 | Ferrucci et al. | |
| 2011/0125734 | A1 | 5/2011 | Duboue et al. | |
| 2012/0124126 | A1* | 5/2012 | Alcazar | H04L 67/16 709/203 |
| 2013/0007055 | A1 | 1/2013 | Brown et al. | |
| 2013/0018652 | A1 | 1/2013 | Ferrucci et al. | |
| 2013/0066886 | A1 | 3/2013 | Bagchi et al. | |
| 2013/0232205 | A1* | 9/2013 | Gorecha | G06Q 10/10 709/206 |
| 2013/0275882 | A1* | 10/2013 | Vuong | G06Q 10/107 715/752 |
| 2013/0346067 | A1 | 12/2013 | Bhatt | |
| 2014/0089235 | A1 | 3/2014 | Lynar | |
| 2015/0149153 | A1 | 5/2015 | Werth et al. | |
| 2015/0242391 | A1 | 8/2015 | Goel et al. | |
| 2015/0278196 | A1 | 10/2015 | Dua et al. | |
| 2015/0304381 | A1 | 10/2015 | Rosansky et al. | |
| 2015/0348128 | A1 | 12/2015 | Zeng et al. | |
| 2016/0071119 | A1* | 3/2016 | Blanchflower | G06F 17/2785 705/7.29 |
| 2016/0147731 | A1 | 5/2016 | Parikh et al. | |
| 2017/0180276 | A1* | 6/2017 | Gershony | H04L 51/02 |

OTHER PUBLICATIONS

Wynne, Martin, "Searching and Concordancing;" 2008, https://ota.ox.ac.uk/documents/searching/handbook.html.*

Corpora4Learning, "Tools & Websites;" Jan. 10, 2015, https://web.archive.org/web/20150110013235/http://www.corpora4learning.net/resources/materials.html.*

Wordpress, "Proofreading;" Oct. 1, 2009, https://web.archive.org/web/20091001233230/https://en.support.wordpress.com/proofreading/.*

Vanderbilt, "OWA Searching and Sorting;" Oct. 19, 2014, https://web.archive.org/web/20141019002321/https://it.vanderbilt.edu/services/messaging/email/owa/search-and-sort.php.*

Adamic, Lada, Adar, Eytan, "How to search a social network;" Feb. 2, 2008, https://arxiv.org/pdf/cond-mat/0310120.pdf.*

Hagermann, J., Danley, L., "A Brief Guide to Professional Writing;" 2002, http://www.add.devry.edu/PDFs/Writing_Guide.pdf.*

Heaps, Stacie, "Tone;" Dec. 17, 2008, https://web.archive.org/web/20081217173458/https://www.writeexpress.com/tone.html.*

M Libraries, "6.2 Writing Style;" Jan. 2, 2016, https://web.archive.org/web/20160102230315/http://open.lib.umn.edu/businesscommunication/chapter/6-2-writing-style/.*

Gilbert, Eric, "Phrases That Signal Workspace Hierarchy;" Feb. 11, 2012, http://comp.social.gatech.edu/papers/cscw12.hierarchy.gilbert.pdf.*

Welton, Alex, "StyleCheck: An Automated Stylistic Analysis Tool;" May 2014, http://www.cs.dartmouth.edu/~trdata/reports/TR2014-754.pdf.*

Hootsuite, "Twitter merge inbox and outbox;" Mar. 2015, https://forum.hootsuite.com/discussion/6592945/twitter-merge-inbox-and-outbox.*

Harkins, Susan, "Use color to identify mail messages to and from specific people;" Jul. 14, 2011, https://www.techrepublic.com/blog/microsoft-office/use-color-to-identify-mail-messages-to-and-from-specific-people/ (Year: 2011).*

List of IBM Patents or Applications Treated as Related, May 18, 2016, 2 pages.

"Sentiment Analysis Leader Lymbix Releases New ToneCheck—Spell-check for the Tone of Your Emails", Lymbix, Inc., Reuters Press Release, Mar. 9, 2011, 4 pages.

High, Rob, "The Era of Cognitive Systems: An Inside Look at IBM Watson and How it Works", IBM Corporation, http://ip.com/pdf/redbook/REDP495500.pdf, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Yuan, Michael J., "Watson and healthcare, How natural language processing and semantic search could revolutionize clinical decision support", IBM developerWorks, IBM Corporation, Apr. 12, 2011, 14 pages.

* cited by examiner

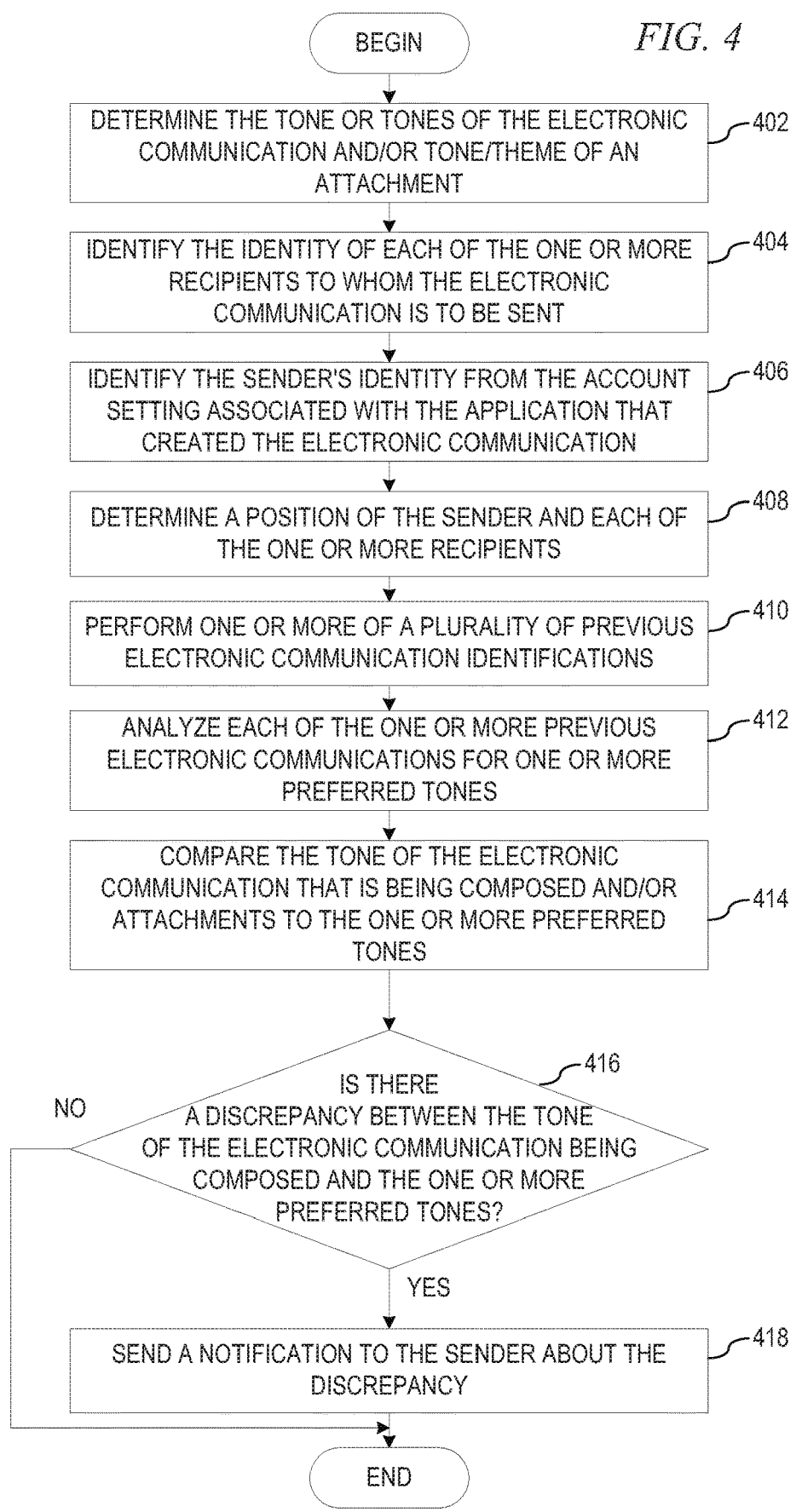

VALIDATING AN ATTACHMENT OF AN ELECTRONIC COMMUNICATION BASED ON RECIPIENTS

BACKGROUND

The present application relates generally to an improved data processing apparatus and method and more specifically to mechanisms for validating an attachment of an electronic communication based on the recipients of the electronic communication.

Tone analysis is a natural language processing task to identify a tone of natural language text. Tone analysis is a general term, but one example of a tone analysis mechanism is the IBM® Tone Analyzer which provides an output for emotional/sentiment tone (anger, cheer, positive, negative, or the like), social/personality tone (agreeable, conscientious, open, or the like) and writing tone (analytical, confident, tentative, or the like). A tone analysis task is seen as very useful in the electronic communications domain so that senders may review the tone of an electronic communication (i.e. an email) before the electronic communication is sent.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for validating an attachment to an electronic communication being composed based on the recipients of the electronic communication. The illustrative embodiment identifies an associated tone or theme of at least one attachment to the electronic communication being composed by a sender. The illustrative embodiment identifies an identity of each of one or more recipients to whom the electronic communication is to be sent and the sender. The illustrative embodiment determines at least one of a relative position, rank, title, or standing of the sender and each of the one or more recipients. The illustrative embodiment identifies one or more previous electronic communications sent to or received from one or more of the one or more recipients. The illustrative embodiment identifies at least one tone of each of the one or more previous electronic communications in order to generate one or more preferred tones. The illustrative embodiment compares the tone or theme of the at least one attachment to the one or more preferred tones. The illustrative embodiment presents a notification to the sender about the discrepancy in response to identifying a discrepancy between the tone or theme of the at least one attachment and the one or more preferred tones.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 depicts a flowchart of the operation performed by the exemplary mechanism to validate the tone of an electronic communication being composed based on the recipients of the electronic communication in accordance with an illustrative embodiment.

DETAILED DESCRIPTION

Figure 1:
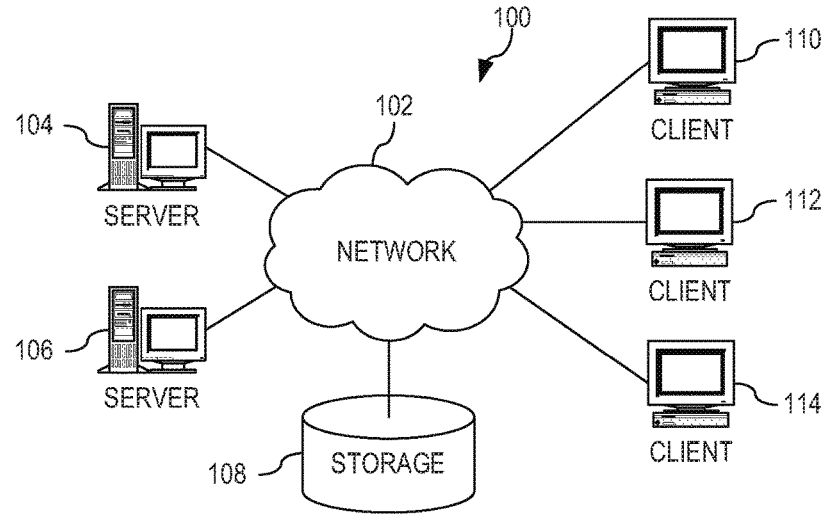
FIG. 1 is an example diagram of a distributed data processing system in which aspects of the illustrative embodiments may be implemented.

As stated previously, tone analysis is a natural language processing task to identify a tone of natural language text. Tone analysis is a general term, but one example of a tone analysis mechanism is the IBM® Tone Analyzer which provides an output for emotional/sentiment tone (anger, cheer, positive, negative, or the like), social/personality tone (agreeable, conscientious, open, or the like) and writing tone (analytical, confident, tentative, or the like). A tone analysis task is seen as very useful in the electronic communications domain so that senders may review the tone of an electronic communication (i.e. an email) before the electronic communication is sent.

However, currently, there is no known mechanism for evaluating whether the tone of an electronic communication being composed by a sender or an attachment to the electronic communication is proper for given recipient(s). That is, current tone analysis technology only provides a tone of the electronic communication being composed to the sender, but it is up to the sender to know whether the tone is appropriate for the recipient(s) of the electronic communication. Thus, the illustrative embodiments provide a mechanism for identifying one or more recipients of an electronic communication and determining whether the tone of the electronic communication being composed or an attachment to the electronic communication is of an appropriate tone for the one or more recipient(s). The appropriate tone for a recipient may be determined by analyzing the tone of previous electronic communications to and/or from the one or more recipients based on a hierarchical chart, organizational chart, or the like, used to identify the position of the sender and the position of the one or more recipients.

For example, if the sender is composing an electronic communication to their second line manager, the tone of electronic communication that sender has received from the second line manager and possibly other second line managers are identified and aggregated for a preferred tone for the electronic communication being composed that is to be sent by the sender. Going one step further, the tone of a response to the electronic communications from the recipient to the second line manager and possibly other second line managers may be identified and aggregated to inform the sender of the tone the sender may expect in return, thereby allowing the sender to adjust the tone of the electronic communication being composed as desired.

Thus, the illustrative embodiments provide mechanisms for validating a tone of an electronic communication being composed and a tone/theme of any attachment, if provided, based on the recipients of the electronic communication. With reference to an electronic communication that is being composed by a sender, the illustrative embodiments determine the tone or tones of the electronic communication. In the illustrative embodiments, the word "tone" is used to cover multiple facets, which may each be identified by different technologies:

sentiment analysis towards entities found in the message (persons, projects, or the like);
psychological state: anger, anxiety, depression, emotional withdrawal, rigidity, impulsiveness, emotional instability, or the like; or
personality insights: openness to experience, conscientiousness, extraversion, agreeableness, and neuroticism (the Big Five), personality and social characteristics, needs, values, or the like.

Research has shown a strong and statistically significant correlation between word choices and personality, emotions, attitudes, intrinsic needs, values, and thought processes. The illustrative embodiments analyze the electronic communication that is being composed for language tones using a linguistic analysis that studies the correlation between various tones and linguistic features in electronic communication. For example, the illustrative embodiments derive emotional scores from the electronic communication using a stacked generalization-based ensemble framework. Stacked generalization is a general method of using a high-level model to combine lower-level models to achieve greater predictive accuracy. Features such as n-grams (unigrams, bigrams and trigrams), punctuation, emoticons, curse words, greeting words (such as hello, hi, and thanks), and sentiment polarity are utilized to classify emotion categories. As another example, the illustrative embodiments derive social scores based on the openness to experience, conscientiousness, extraversion, agreeableness, and neuroticism of the electronic communication. As still another example, the illustrative embodiments identify the writing style of the electronic communication using a linguistic analysis of each sentence.

In the illustrative embodiments, the tone of the electronic communication that is being composed may be identified by any type of tone analysis mechanism, such as the IBM® Tone Analyzer, in order to provide an output for emotional/sentiment tone (anger, cheer, positive, negative, or the like), social/personality tone (agreeable, conscientious, open, or the like) and writing tone (analytical, confident, tentative, or the like). That is, while the illustrative embodiments use the IBM® Tone Analyzer as an example, the illustrative embodiments are not limited to only the IBM® Tone Analyzer as any type of tone analyzer may be utilized to determine the tone or tones of the electronic communication, such as the AlchemyAPI™ Entity-level Sentiment Analysis. Furthermore, the illustrative embodiments are directed to expand on identifying the tone of the electronic communication in order to identify whether the tone of the electronic communication is appropriate for the recipients to whom the electronic communication is to be sent.

A similar process exists for analyzing attachments to an electronic communication. For example, if the attachment is a text attachment, such as a Microsoft® Word document, a pdf document, or the like, the illustrative embodiments would analyze such text documents in the same manner as described previously with regard to the electronic communication itself. With regard to image attachments, such as pictures, videos, or the like, the illustrative embodiments utilize image recognition software, such as AlchemyAPI™ services, to recognize faces, entities, objects, buildings, animals, or the like, in order to identify a theme of the pictures, videos, or the like. The identified theme of the image is then provided to the tone analysis mechanism and analyzed in the same manner as described previously with regard to the electronic communication itself. With regard to an audio track associated with a video, if present, the illustrative embodiments utilize a speech-to-text service that first converts the audio to text and then analyzes the text in the same manner as described previously with regard to the electronic communication itself. Still further, the illustrative embodiment may analyze hyperlinks included in an electronic commination. The illustrative embodiments follow the link and, if the link is a text link, analyze the text in the same manner as described previously with regard to the electronic communication itself. If the link were an image link, then the link would be analyzed as described previously with regard to image attachments.

In another embodiment, the author of an attachment, if available, may be extracted from the attachment. If the author and the sender are the same person, then the tone of the attachment may be analyzed as if the attachment was part of the electronic communication itself. Otherwise, sentiment analysis may be applied to the electronic communication to understand the sender's opinion about the attachment. The combination of the sender's sentiment and the attachment tone is then compared to previous electronic communications in order to identify whether the tone of the electronic communication is appropriate for the recipients to whom the electronic communication is to be sent. For example, an attachment with tone discrepancies, combined with an electronic communication where the sender has a negative sentiment towards the attachment, may not require any adjustment by the sender.

Therefore, as one example, if the attachment were a virtual business card attachment that includes a picture of the sender, then the image recognition software would identify the image as the sender's own image and determine its appropriateness as described below, which would be considered reasonable attachment. As another example, if the attachment is a video of the CEO, then the image recognition software would identify the image as the CEO, analyze the text for tone as described previously and determine the video's appropriateness as described below, which would be considered reasonable attachment. As a final example, if the attachment were a picture of a kitten, then the image recognition software would identify the image as a kitten and determine its appropriateness as described below. Based on the history of previously electronic communication, the picture of the kitten may be considered inappropriate.

Therefore, for the sender of the electronic communication that is being composed and for each of one or more recipients of the electronic communication, the illustrative embodiments determine an associated relative position, rank, title, standing, or the like, hereinafter referred to simply as position. That is, for the recipients of the electronic communication, the illustrative embodiments identify the identity of each of the one or more recipients to whom the electronic communication is to be sent, by analyzing the "To" field, the "Cc" field, the "Bcc" field, or the like. Further, for the sender, the illustrative embodiments identify the sender's identity from the account setting associated with the application that created the electronic communication. The identity for the sender and each of the one or more recipients, may include a full name (first, middle, and/or last), an email address, an associated company (may be identified from the email address), or the like.

With the identities of the sender and each of the one or more recipients of the electronic communication identified, the illustrative embodiments determine a position of the sender and each of the one or more recipients utilizing a corpus of information, such as:

organizational charts for the company where the sender is employed;

organizational charts gathered from websites associated with the domain name(s) that represents the administrative realm for the electronic communication, e.g., a company's domain name;

information from social media sites such as Linkedin®, Affluence™, Biznik®, or the like; or as well as any other type of hierarchical or informational structure that represents or provides the sender's and each of the recipient's position.

Determining the position of the sender and each of the one or more recipients may just be the depth of each of them in the corpus of information. However, more complex implementations of the illustrative embodiments may take into consideration whether or not the sender and each of the one or more recipients are in the same branch, the average depth of each branch, or the like. That is, for example, if the sender and a recipient have indistinguishable or vague titles, then the illustrative embodiment may search an organizational chart to determine a relative distance in the organizational tree between the sender and the recipient.

In one embodiment, using the identified identity information and the position of the sender and the one or more recipients, the illustrative embodiments search the sender's history of electronic communications for one or more previous electronic communications sent to or received from the one or more recipients. That is, the illustrative embodiments search for one or more previous electronic communications sent to or received from the one or more recipients from the sender in order to identify a tone of those previous electronic communications.

In another embodiment, if there are no previous electronic communications in the sender's history of electronic communications sent to or received from one or more of the one or more recipients, the illustrative embodiments utilizes the previous corpus of information and the position of the one or more of the one or more recipients for which there are no previous electronic communications to identify one or more other persons that have the same or similar position of the one or more of the one or more recipients for which there are no previous electronic communications. Then, using the identified identity information of the one or more other persons with a same or similar position of the one or more of the one or more recipients for which there are no previous electronic communications, the illustrative embodiments search the sender's history of electronic communications for one or more previous electronic communications sent to or received from the one or more other persons with a same or similar position. For example, if a first line manager has not previously sent an electronic communication to a first vice president of a company, then the illustrative embodiment would determine whether there are other vice presidents in the same company as the first vice president. If there are other vice presidents in the same company as the first vice president, then the illustrative embodiments would search the sender's history of electronic communications for one or more previous electronic communications sent to the other vice presidents.

In still another embodiment, in addition to searching the sender's history of electronic communications for one or more previous electronic communications sent to or received from the one or more recipients, the illustrative embodiments may search another corpus of information of electronic communications for one or more previous electronic communications sent to or received from persons with a same or similar position to that of the sender. For example, if a first line manager is a relatively new manager and has not previously sent any electronic communications to any vice presidents of a company, then the illustrative embodiment would determine whether there are other first line managers that have sent electronic communications to the vice presidents in the company. If there are other first line managers that have sent electronic communications to one or more vice presidents in the company, then the illustrative embodiments would search the history of electronic communications for the other first line managers for one or more previous electronic communications sent to the vice presidents.

Regardless of which embodiment is used to identify the one or more previous electronic communications, the illustrative embodiments analyze each of the one or more previous electronic communications for one or more preferred tones using the previously described tone analysis mechanism in order to provide an output for emotional/sentiment tone (anger, cheer, positive, negative, or the like), social/personality tone (agreeable, conscientious, open, or the like), and writing tone (analytical, confident, tentative, or the like) for each of the one or more previous electronic communications. The illustrative embodiments may differentiate between those previous electronic communications that were sent by the sender to each of the one or more recipients versus those electronic communications that were received by the sender from each of the one or more recipients. This differentiation may be performed to determine how the previously sent electronic communications were received by the one or more recipients. That is, the illustrative embodiment may compare the tone of the electronic communications sent by the sender to the one or more recipients to the tone of responses to the previously electronic communications received by the sender from the one or more recipients in order to determine whether the tone used by the sender was appropriate, i.e. did the response indicate that the tone of the sender was or was not appropriate?

With the one or more preferred tones of the previous electronic communications determined, the illustrative embodiments compare the tone of the electronic communication that is being composed and a tone/theme of any attachments to the electronic communication, if present, to the one or more preferred tones. If there is a discrepancy between the tone of the electronic communication being composed and/or the tone/theme of any attachment and the one or more preferred tones, the illustrative embodiments provide a notification to the sender of the discrepancy. In one embodiment, the notification may be a simple notification that notifies the sender that the tone of the electronic communication may annoy, irritate, or the like, one or more of the one or more recipients. In another embodiment, the notification may be a complex notification that not only notifies the sender that the tone of the electronic communication may annoy, irritate, or the like, one or more of the one or more recipients but also identify which specific recipient the electronic communication may annoy, irritate, or the like, as well as the specific recipient's position. Additionally, the illustrative embodiment may be able to identify, based on the tone analysis and the comparison, the specific portion of the electronic communication that is of concern so that the sender may adjust only that portion of the electronic communication and not have to rewrite the entire electronic communication.

Having given an overview of operations in accordance with one illustrative embodiment, before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
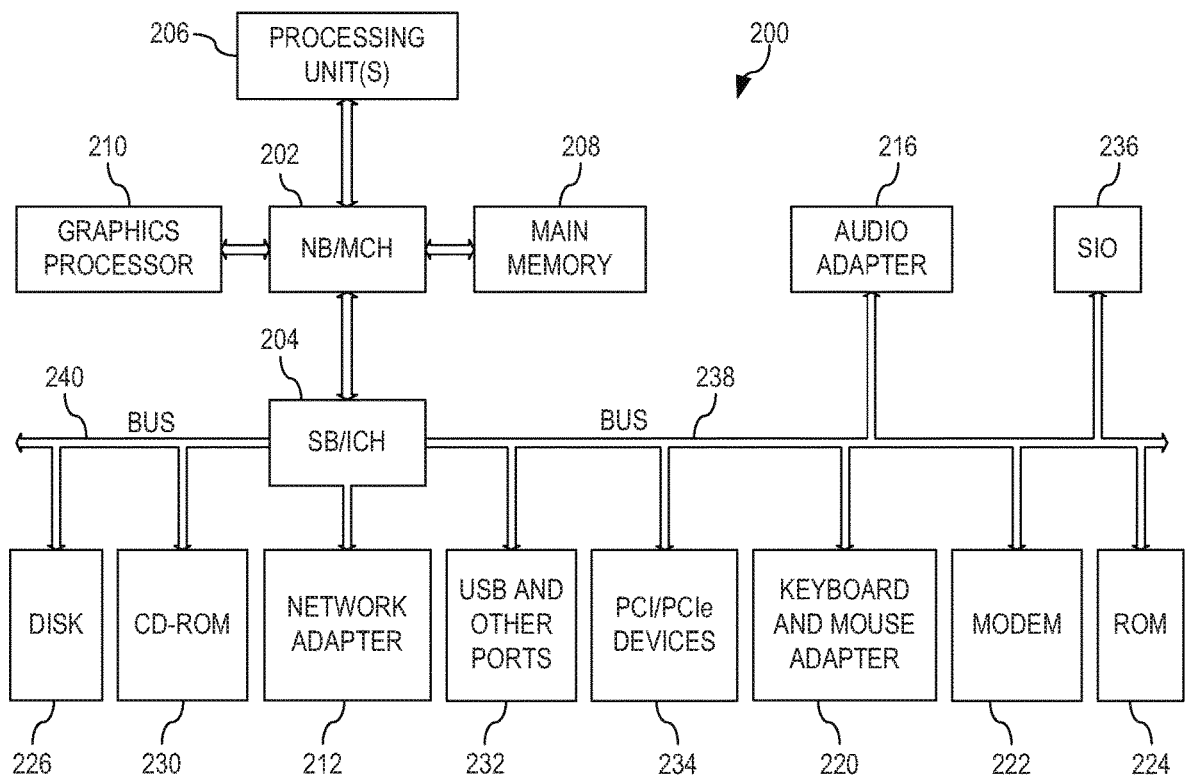
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 comprises at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism for validating the tone of an electronic communication being composed based on the recipients of the electronic communication. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates validating the tone of an electronic communication being composed based on the recipients of the electronic communication.

As noted above, the mechanisms of the illustrative embodiments utilize specifically configured computing devices, or data processing systems, to perform the operations for validating the tone of an electronic communication being composed based on the recipients of the electronic communication. These computing devices, or data processing systems, may comprise various hardware elements that are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the validation of a tone of an electronic communication being composed based on the recipients of the electronic communication.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
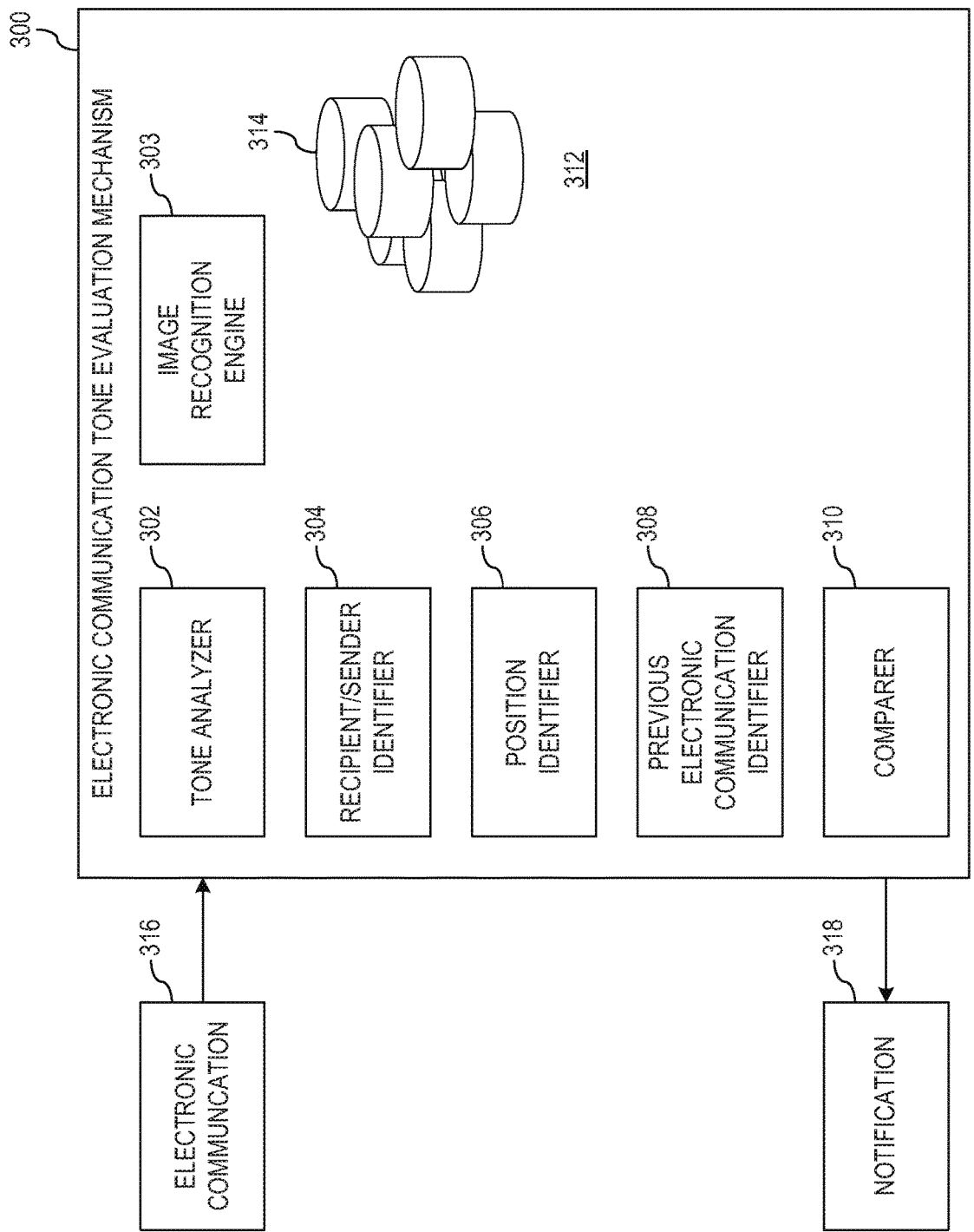
FIG. 3 depicts a functional block diagram for validating the tone of an electronic communication being composed based on the recipients of the electronic communication in accordance with an illustrative embodiment.

FIG. 3 depicts a functional block diagram of an electronic communication tone evaluation mechanism for validating the tone of an electronic communication being composed based on the recipients of the electronic communication in accordance with an illustrative embodiment. Electronic communication tone evaluation mechanism 300, which is in a data processing system such as data processing system 200 of FIG. 2, comprises tone analyzer 302, image recognition engine 303, recipient/sender identifier 304, position identifier 306, previous electronic communication identifier 308, comparer 310, and corpora 312. In the illustrative embodiments, corpora 312 may comprise various sources themselves, different collections of sources, and the like, each of which represent a different corpus 314 within the corpora 312. For example, in accordance with the illustrative embodiments, one corpus 314 may comprise organizational charts for the company where the sender is employed; organizational charts gathered from websites associated with the domain name(s) of the one or more recipients representing the administrative realm for the electronic communication; information from social media sites such as Linkedin®, Affluence™, Biznik®, or the like; and/or any other type of hierarchical or informational structure that represents or provides the sender's and each of the recipient's position. As another example, in accordance with the illustrative embodiments, another corpus 314 may comprise emails, messages, texts, or the like, for the sender, for the company of the sender, or for a plurality of companies. The emails, messages, texts, or the like, in this corpus 314 may be accessed for tone analysis only and are not accessible for reading by any other person other than the intended user of the specific email, message, text, or the like.

Responsive to a sender composing electronic communication 316 that comprises at least one recipient and at least one sentence that is to be sent to the at least one recipient, tone analyzer 302 determines the tone or tones of the electronic communication. Again, in the illustrative embodiments, the word "tone" is used to cover multiple facets, which may each be identified by different technologies:
  sentiment analysis towards entities found in the message (persons, projects, or the like);
  psychological state: anger, anxiety, depression, emotional withdrawal, rigidity, impulsiveness, emotional instability, or the like; or
  personality insights: openness to experience, conscientiousness, extraversion, agreeableness, and neuroticism (the Big Five), personality and social characteristics, needs, values, or the like.

Tone analyzer 302 analyzes the electronic communication that is being composed for language tones using a linguistic analysis that studies the correlation between various tones and linguistic features in electronic communication. For example, the illustrative embodiments derive emotional scores from the electronic communication using a stacked generalization-based ensemble framework. Stacked generalization is a general method of using a high-level model to combine lower-level models to achieve greater predictive accuracy. Features such as n-grams (unigrams, bigrams and trigrams), punctuation, emoticons, curse words, greeting words (such as hello, hi, and thanks), and sentiment polarity are utilized to classify emotion categories. As another example, the illustrative embodiments derive social scores based on the openness to experience, conscientiousness, extraversion, agreeableness, and neuroticism of the electronic communication. As still another example, the illustrative embodiments identify the writing style of the electronic communication using a linguistic analysis of each sentence.

Responsive to the user attaching an attachment to the electronic communication, if the attachment is a text attachment, an audio portion of a video attachment that has been converted to text, a text document that is referenced by a link, or the like, tone analyzer 302 analyzes such text documents in the same manner as described previously with regard to the electronic communication itself. If the attachment is an image attachment, video attachment, image or video referenced by a link, or the like, image recognition engine 303 analyzes the image(s) to identify one or more of faces, entities, objects, buildings, animals, or the like, in order to identify a theme of the pictures, videos, or the like. The identified theme of the image is then provided to the tone analyzer 302 and analyzed in the same manner as described previously with regard to the electronic communication itself.

In order to identify whether the tone of the electronic communication is appropriate for the recipients to whom the electronic communication is to be sent, recipient/sender identifier 304 identifies the identity of each of the one or more recipients to whom the electronic communication is to be sent, by analyzing the "To" field, the "Cc" field, the "Bcc" field, or the like. Further, for the sender, recipient/sender identifier 304 identifies the sender's identity from the account setting associated with the application that created the electronic communication. The identity for the sender and each of the one or more recipients, may include a full name (first, middle, and/or last), an email address, an associated company (may be identified from the email address), or the like.

With the identities of the sender and each of the one or more recipients of the electronic communication identified, position identifier 306 determines a position of the sender and each of the one or more recipients utilizing corpus 314 in corpora 312 that comprises information, such as organizational charts for the company where the sender is employed; organizational charts gathered from websites associated with the domain name(s) of the one or more recipients representing the administrative realm for the electronic communication; information from social media sites such as Linkedin®, Affluence™, Biznik®, or the like; and/or any other type of hierarchical or informational structure that represents or provides the sender's and each of the recipient's position.

Determining the position of the sender and each of the one or more recipients may just be the depth of each of them in the corpus of information. However, more complex implementations of the illustrative embodiments may take into consideration whether or not the sender and each of the one or more recipients are in the same branch, the average depth of each branch, or the like. That is, for example, if the sender and a recipient have indistinguishable or vague titles, then the illustrative embodiment may search an organizational chart to determine a relative distance in the organizational tree between the sender and the recipient.

Using the identified identity information and the position of the sender and the one or more recipients, previous electronic communication identifier 308 may perform one of a plurality of previous electronic communication identifications. In one illustrative embodiment, previous electronic communication identifier 308 searches a corpus 314 of the sender's history of electronic communications for one or more previous electronic communications sent to or received from the one or more recipients. That is, the illustrative embodiments search for one or more previous electronic communications sent to or received from the one or more recipients from the sender in order to identify a tone of those previous electronic communications.

In another embodiment, if there are no previous electronic communications in the sender's history of electronic communications sent to or received from one or more of the one or more recipients, previous electronic communication identifier 308 requests position identifier 306 identify one or more other persons that have the same or similar position of the one or more of the one or more recipients for which there are no previous electronic communications. Using the identified identity information of the one or more other persons with a same or similar position of the one or more of the one or more recipients for which there are no previous electronic communications, previous electronic communication identifier 308 searches the corpus of the sender's history of electronic communications for one or more previous electronic communications sent to or received from the one or more other persons with a same or similar position.

In still another embodiment, in addition to searching the sender's history of electronic communications for one or more previous electronic communications sent to or received from the one or more recipients, previous electronic communication identifier 308 requests position identifier 306 identify one or more other persons that have the same or similar position to that of the sender. Using the one or more other persons that have the same or similar position to that of the sender, previous electronic communication identifier 308 searches another corpus 314 of information of electronic communications for one or more previous electronic communications sent to or received from persons with the same or similar position to that of the sender.

Regardless of which embodiment is used to identify the one or more previous electronic communications, tone analyzer 302 analyzes each of the one or more previous electronic communications for one or more preferred tones using the previously described tone analysis mechanism in order to provide an output for emotional/sentiment tone (anger, cheer, positive, negative, or the like), social/personality tone (agreeable, conscientious, open, or the like), and writing tone (analytical, confident, tentative, or the like) for each of the one or more previous electronic communications. The illustrative embodiments may differentiate between those previous electronic communications that were sent by the sender to each of the one or more recipients versus those electronic communications that were received by the sender from each of the one or more recipients. This differentiation may be performed to determine how the previously sent electronic communications were received by the one or more recipients. That is, the illustrative embodiment may compare the tone of the electronic communications sent by the sender to the one or more recipients to the tone of responses to the previously electronic communications received by the sender from the one or more recipients in order to determine whether the tone used by the sender was appropriate, i.e. did the response indicate that the tone of the sender was or was not appropriate?

With the one or more preferred tones of the previous electronic communications determined, comparer 310 compares the tone of the electronic communication that is being composed to the one or more preferred tones. If there is a discrepancy between the tone of the electronic communication being composed and the one or more preferred tones, comparer 310 provides notification 318 to the sender of the discrepancy. In one embodiment, the notification may be a simple notification that notifies the sender that the tone of the electronic communication may annoy, irritate, or the like, one or more of the one or more recipients. In another embodiment, the notification may be a complex notification that not only notifies the sender that the tone of the electronic communication may annoy, irritate, or the like, one or more of the one or more recipients but also identifies which specific recipient the electronic communication may annoy, irritate, or the like, as well as the specific recipient's position. Additionally, comparer 310 may be able to identify, based on the tone analysis and the comparison, the specific portion of the electronic communication that is of concern so that the sender may adjust only that portion of the electronic communication and not have to rewrite the entire electronic communication.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 4 depicts a flowchart of the operation performed by the exemplary mechanism to validate the tone of an electronic communication being composed based on the recipients of the electronic communication in accordance with an illustrative embodiment. As the operation begins, responsive to a sender composing an electronic communication that comprises at least one recipient and at least one sentence and/or an attachment that is to be sent to the at least one recipient, an electronic communication tone evaluation mechanism determines the tone or tones of the electronic communication and/or a tone/theme of any attachment to the electronic communication being composed by the sender (step 402). The electronic communication tone evaluation mechanism analyzes the electronic communication that is being composed as well as any text attachment, audio portion of a video that has been converted to text, or text link for language tones using a linguistic analysis that studies the correlation between various tones and linguistic features in electronic communication. For example, the illustrative embodiments derive emotional scores from the electronic communication using a stacked generalization-based ensemble framework. Stacked generalization is a general method of using a high-level model to combine lower-level models to achieve greater predictive accuracy. Features such as n-grams (unigrams, bigrams and trigrams), punctuation, emoticons, curse words, greeting words (such as hello, hi, and thanks), and sentiment polarity are utilized to classify emotion categories. As another example, the illustrative embodiments derive social scores based on the openness to experience, conscientiousness, extraversion, agreeableness, and neuroticism of the electronic communication. As still another example, the illustrative embodiments identify the writing style of the electronic communication using a linguistic analysis of each sentence. The electronic communication tone evaluation mechanism analyzes any image attachment, video attachment, image or video referenced by a link, or the like, to identify one or more of faces, entities, objects, buildings, animals, or the like, in order to identify a theme of the pictures, videos, or the like. The electronic communication tone evaluation mechanism analyzes the theme in the same manner as described previously with regard to the electronic communication itself.

In order to identify whether the tone of the electronic communication is appropriate for the recipients to whom the electronic communication is to be sent, the electronic communication tone evaluation mechanism identifies the identity of each of the one or more recipients to whom the electronic communication is to be sent (step 404). The electronic communication tone evaluation mechanism performs this operation by analyzing the "To" field, the "Cc" field, the "Bcc" field, or the like. Further, for the sender, the electronic communication tone evaluation mechanism identifies the sender's identity from the account setting associated with the application that created the electronic communication (step 406). The identity for the sender and each of the one or more recipients, may include a full name (first, middle, and/or last), an email address, an associated company (may be identified from the email address), or the like.

With the identities of the sender and each of the one or more recipients of the electronic communication identified, the electronic communication tone evaluation mechanism determines a position of the sender and each of the one or more recipients (step 408). The electronic communication tone evaluation mechanism determines the position of the sender and each of the one or more recipients utilizing a corpus in the corpora that comprises information, such as organizational charts for the company where the sender is employed; organizational charts gathered from websites associated with the domain name(s) of the one or more recipients representing the administrative realm for the electronic communication; information from social media sites such as Linkedin®, Affluence™, Biznik®, or the like; and/or any other type of hierarchical or informational structure that represents or provides the sender's and each of the recipient's position. Determining the position of the sender and each of the one or more recipients may just be the depth of each of them in the corpus of information. However, more complex implementations of the illustrative embodiments may take into consideration whether or not the sender and each of the one or more recipients are in the same branch, the average depth of each branch, or the like. That is, for example, if the sender and a recipient have indistinguishable or vague titles, then the illustrative embodiment may search an organizational chart to determine a relative distance in the organizational tree between the sender and the recipient.

Using the identified identity information and the position of the sender and the one or more recipients, the electronic communication tone evaluation mechanism performs one or more of a plurality of previous electronic communication identifications (step 410). In one illustrative embodiment, the electronic communication tone evaluation mechanism searches a corpus of the sender's history of electronic communications for one or more previous electronic communications sent to or received from the one or more recipients. That is, the illustrative embodiments search for one or more previous electronic communications sent to or received from the one or more recipients from the sender in order to identify a tone of those previous electronic communications.

In another embodiment, if there are no previous electronic communications in the sender's history of electronic communications sent to or received from one or more of the one or more recipients, the electronic communication tone evaluation mechanism identifies one or more other persons that have the same or similar position of the one or more of the one or more recipients for which there are no previous electronic communications. Using the identified identity information of the one or more other persons with a same or similar position of the one or more of the one or more recipients for which there are no previous electronic communications, the electronic communication tone evaluation mechanism searches the corpus of the sender's history of electronic communications for one or more previous electronic communications sent to or received from the one or more other persons with a same or similar position.

In still another embodiment, in addition to searching the corpus of the sender's history of electronic communications for one or more previous electronic communications sent to or received from the one or more recipients, the electronic communication tone evaluation mechanism identifies one or more other persons that have the same or similar position to that of the sender. Using the one or more other persons that have the same or similar position to that of the sender, the electronic communication tone evaluation mechanism searches another corpus of information of electronic communications for one or more previous electronic communications sent to or received from persons with the same or similar position to that of the sender.

Regardless of which embodiment is used to identify the one or more previous electronic communications, the electronic communication tone evaluation mechanism analyzes each of the one or more previous electronic communications for one or more preferred tones (step 412). The electronic communication tone evaluation mechanism performs the analysis of each of the one or more previous electronic communications for one or more preferred tones using the previously described tone analysis mechanism in order to provide an output for emotional/sentiment tone (anger, cheer, positive, negative, or the like), social/personality tone (agreeable, conscientious, open, or the like), and writing tone (analytical, confident, tentative, or the like) for each of the one or more previous electronic communications. The electronic communication tone evaluation mechanism may differentiate between those previous electronic communications that were sent by the sender to each of the one or more recipients versus those electronic communications that were received by the sender from each of the one or more recipients. This differentiation may be performed to determine how the previously sent electronic communications were received by the one or more recipients. That is, the electronic communication tone evaluation mechanism may compare the tone of the electronic communications sent by the sender to the one or more recipients to the tone of responses to the previously electronic communications received by the sender from the one or more recipients in order to determine whether the tone used by the sender was appropriate, i.e. did the response indicate that the tone of the sender was or was not appropriate?

With the one or more preferred tones of the previous electronic communications determined, the electronic communication tone evaluation mechanism compares the tone of the electronic communication that is being composed and/or attachments to the one or more preferred tones (step 414). The electronic communication tone evaluation mechanism then determines whether there is a discrepancy between the tone of the electronic communication being composed and the one or more preferred tones (step 416). If at step 416 the electronic communication tone evaluation mechanism determines that there is a discrepancy between the tone of the electronic communication being composed and the one or more preferred tones, then the electronic communication tone evaluation mechanism presents a notification to the sender about the discrepancy (step 418), with the operation terminating thereafter. In one embodiment, the notification may be a simple notification that notifies the sender that the tone of the electronic communication may annoy, irritate, or the like, one or more of the one or more recipients. In another embodiment, the notification may be a complex notification that not only notifies the sender that the tone of the electronic communication may annoy, irritate, or the like, one or more of the one or more recipients but also identifies which specific recipient the electronic communication may annoy, irritate, or the like, as well as the specific recipient's position. Additionally, the electronic communication tone evaluation mechanism may be able to identify, based on the tone analysis and the comparison, the specific portion of the electronic communication that is of concern so that the sender may adjust only that portion of the electronic communication and not have to rewrite the entire electronic communication. If at step 416 the electronic communication tone evaluation mechanism determines that there fails to be a discrepancy between the tone of the electronic communication being composed and the one or more preferred tones, the operation terminates.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for identifying one or more recipients of an electronic communication and determining whether the tone of the electronic communication being composed is an appropriate tone for the one or more recipient(s). The appropriate tone for a recipient may be determined by analyzing the tone of previous electronic communications to and from the one or more recipients based on a hierarchical chart, organizational chart, or the like, used to identify the position of the sender and the position of the one or more recipients.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory coupled to the at least one processor, the at least one memory comprising instructions that are executed by the at least one processor to cause the at least one processor to implement an electronic communication tone evaluation mechanism for validating an attachment to an electronic communication being composed based on the recipients of the electronic communication, the method comprising:

identifying, by the data processing system, an associated tone or theme of at least one attachment to the electronic communication being composed by a sender;

identifying, by the data processing system, an identity of each of one or more recipients to whom the electronic communication is to be sent and the sender;

determining, by the data processing system, at least one of a relative position, rank, title, or standing of the sender and each of the one or more recipients;

identifying, by the data processing system, one or more previous electronic communications sent to or received from one or more of the one or more recipients;

responsive to a failure to identify previous electronic communications in the sender's history of electronic communications sent to or received from one or more of the one or more recipients, identifying, by the data processing system, one or more other persons having a same or similar position of the one or more of the one or more recipients for which there are no previous electronic communications;

using the identified identity information of the one or more other persons with the same or similar position of the one or more of the one or more recipients for which there are no previous electronic communications, searching, by the data processing system, a corpus of the sender's history of electronic communications for one or more previous electronic communications sent to or received from the one or more other persons with the same or similar position;

identifying, by the data processing system, at least one tone of each of the one or more previous electronic communications sent to or received from the one or more other persons with the same or similar position in order to generate one or more preferred tones;

comparing, by the data processing system, the tone or theme of the at least one attachment to the one or more preferred tones; and responsive to identifying a discrepancy between the tone or theme of the at least one attachment and the one or more preferred tones, presenting, by the data processing system, a notification to the sender about the discrepancy.

2. The method of claim 1, wherein the identification of the tone or theme of the at least one attachment to the electronic communication is analyzed for at least one of language tones using a linguistic analysis that studies the correlation between various tones and linguistic features in the attachment to the electronic communication; social scores based on the openness to experience, conscientiousness, extraversion, agreeableness, and neuroticism of the attachment to the electronic communication; or writing style of the attachment to electronic communication using a linguistic analysis of each sentence.

3. The method of claim 1, wherein determining the at least one relative position, rank, title, or standing of the sender and each of the one or more recipients comprises:
identifying the at least one relative position, rank, title, or standing of the sender and each of the one or more recipients from at least one of an organizational chart for the company where the sender is employed; organizational charts gathered from websites associated with a domain name of an email of the one or more recipients representing the administrative realm for the electronic communication; information from social media sites; or a hierarchical or informational data structure.

4. The method of claim 1, wherein determining the at least one relative position, rank, title, or standing of the sender and each of the one or more recipients comprises:
determining a relative distance between the at least one relative position, rank, title, or standing of the sender and the at least one relative position, rank, title, or standing of each of the one or more recipients.

5. The method of claim 1, wherein identifying the one or more previous electronic communications sent to or received from one or more of the one or more recipients comprises:
searching a corpus of the sender's history of electronic communications for the one or more previous electronic communications sent to or received from the one or more of the one or more recipients.

6. The method of claim 1, wherein identifying the one or more previous electronic communications sent to or received from one or more of the one or more recipients comprises:
identifying one or more other persons that have the same or similar position to that of the sender; and
using the one or more other persons that have the same or similar position to that of the sender, searching a corpus of information of electronic communications for one or more previous electronic communications sent to or received from persons with the same or similar position to that of the sender.

7. The method of claim 1, wherein identifying at least one tone of each of the one or more previous electronic communications in order to generate the one or more preferred tones comprises:
differentiating between those previous electronic communications that were sent by the sender to each of the one or more recipients versus those previous electronic communications that were received by the sender from each of the one or more recipients; and
comparing the tone of the previous electronic communications sent by the sender to the one or more recipients to the tone of responses to the previous electronic communications received by the sender from the one or more recipients in order to generate the one or more preferred tones.

8. The method of claim 1, wherein the notification notifies the sender that the tone or theme of the attachment to the electronic communication may annoy or irritate one or more of the one or more recipients.

9. The method of claim 1, wherein the notification notifies the sender that the tone or theme of the attachment to the electronic communication may annoy or irritate one or more of the one or more recipients; identifies one or more specific recipients the electronic communication may annoy or irritate; and identifies a position of each of the one or more specific recipients.

10. A computer program product comprising a computer readable storage medium having a computer readable program stored therein, wherein the computer readable program, when executed on a computing device, causes the computing device to implement an electronic communication tone evaluation mechanism for validating an attachment to an electronic communication being composed based on the recipients of the electronic communication, and further cause the computing device to:
identify, by the computing device, an associated tone or theme of at least one attachment to an electronic communication being composed by a sender;
identify, by the computing device, an identity of each of one or more recipients to whom the electronic communication is to be sent and the sender;
determine, by the computing device, at least one of a relative position, rank, title, or standing of the sender and each of the one or more recipients;
identify, by the computing device, one or more previous electronic communications sent to or received from one or more of the one or more recipients;
responsive to a failure to identify previous electronic communications in the sender's history of electronic communications sent to or received from one or more of the one or more recipients, identify, by the computing device, one or more other persons having a same or similar position of the one or more of the one or more recipients for which there are no previous electronic communications;
using the identified identity information of the one or more other persons with the same or similar position of the one or more of the one or more recipients for which there are no previous electronic communications, search, by the computing device, a corpus of the sender's history of electronic communications for one or more previous electronic communications sent to or received from the one or more other persons with the same or similar position;
identify, by the computing device, at least one tone of each of the one or more previous electronic communications sent to or received from the one or more other persons with the same or similar position in order to generate one or more preferred tones;
compare, by the computing device, the tone or theme of the of the at least one attachment to the one or more preferred tones; and
responsive to identifying a discrepancy between the tone or theme of the of the at least one attachment and the one or more preferred tones, present, by the computing device, a notification to the sender about the discrepancy.

11. The computer program product of claim 10, wherein the identification of the tone or theme of the at least one attachment to the electronic communication being composed is analyzed for at least one of language tones using a linguistic analysis that studies the correlation between various tones and linguistic features in electronic communication; social scores based on the openness to experience, conscientiousness, extraversion, agreeableness, and neuroticism of the electronic communication; or writing style of the electronic communication using a linguistic analysis of each sentence.

12. The computer program product of claim 10, wherein the computer readable program to determine the at least one relative position, rank, title, or standing of the sender and each of the one or more recipients further causes the computing device to:

identify the at least one relative position, rank, title, or standing of the sender and each of the one or more recipients from at least one of an organizational chart for the company where the sender is employed; organizational charts gathered from websites associated with a domain name of an email of the one or more recipients representing the administrative realm for the electronic communication; information from social media sites; or a hierarchical or informational data structure.

13. The computer program product of claim 10, wherein the computer readable program to determine the at least one relative position, rank, title, or standing of the sender and each of the one or more recipients further causes the computing device to:

determine a relative distance between the at least one relative position, rank, title, or standing of the sender and the at least one relative position, rank, title, or standing of each of the one or more recipients.

14. The computer program product of claim 10, wherein the computer readable program to identify the one or more previous electronic communications sent to or received from one or more of the one or more recipients further causes the computing device to:

search a corpus of the sender's history of electronic communications for the one or more previous electronic communications sent to or received from the one or more of the one or more recipients.

15. The computer program product of claim 10, wherein the computer readable program to identify the one or more previous electronic communications sent to or received from one or more of the one or more recipients further causes the computing device to:

identify one or more other persons that have the same or similar position to that of the sender; and using the one or more other persons that have the same or similar position to that of the sender, search a corpus of information of electronic communications for one or more previous electronic communications sent to or received from persons with the same or similar position to that of the sender.

16. The computer program product of claim 10, wherein the computer readable program to identify at least one tone of each of the one or more previous electronic communications in order to generate the one or more preferred tones further cases the computing device to:

differentiate between those previous electronic communications that were sent by the sender to each of the one or more recipients versus those previous electronic communications that were received by the sender from each of the one or more recipients; and compare the tone of the previous electronic communications sent by the sender to the one or more recipients to the tone of responses to the previous electronic communications received by the sender from the one or more recipients in order to generate the one or more preferred tones.

17. The computer program product of claim 10, wherein the notification notifies the sender of at least one of: that the tone or theme of the attachment to the electronic communication may annoy or irritate one or more of the one or more recipients; identifies one or more specific recipients the electronic communication may annoy or irritate; or identifies a position of each of the one or more specific recipients.

18. An apparatus comprising:

at least one processor; and at least one memory coupled to the at least one processor, wherein the at least one memory comprises instructions which, when executed by the at least one processor, cause the at least one processor to implement an electronic communication tone evaluation mechanism for validating an attachment to an electronic communication being composed based on the recipients of the electronic communication, and further causes the processor to:

identify, by the apparatus, an associated tone or theme of at least one attachment to an electronic communication being composed by a sender;

identify, by the apparatus, an identity of each of one or more recipients to whom the electronic communication is to be sent and the sender;

determine, by the apparatus, at least one of a relative position, rank, title, or standing of the sender and each of the one or more recipients;

identify, by the apparatus, one or more previous electronic communications sent to or received from one or more of the one or more recipients;

responsive to a failure to identify previous electronic communications in the sender's history of electronic communications sent to or received from one or more of the one or more recipients, identify, by the apparatus, one or more other persons having a same or similar position of the one or more of the one or more recipients for which there are no previous electronic communications;

using the identified identity information of the one or more other persons with the same or similar position of the one or more of the one or more recipients for which there are no previous electronic communications, search, by the apparatus, a corpus of the sender's history of electronic communications for one or more previous electronic communications sent to or received from the one or more other persons with the same or similar position;

identify, by the apparatus, at least one tone of each of the one or more previous electronic communications sent to or received from the one or more other persons with the same or similar position in order to generate one or more preferred tones;

compare, by of the apparatus, the tone or theme of the of the at least one attachment to the one or more preferred tones; and responsive to identifying a discrepancy between the tone or theme of the of the at least one attachment and the one or more preferred tones, present, by the apparatus, a notification to the sender about the discrepancy.

* * * * *